United States Patent

Mizutani et al.

[11] Patent Number: 5,431,259
[45] Date of Patent: Jul. 11, 1995

[54] DAMPING FORCE CONTROL TYPE HYDRAULIC SHOCK ABSORBER

[75] Inventors: Yoichi Mizutani; Takao Nakadate, both of Kanagawa; Takashi Nezu, Tokyo, all of Japan

[73] Assignee: Tokico, Ltd., Kanagawa, Japan

[21] Appl. No.: 154,466

[22] Filed: Nov. 18, 1993

[30] Foreign Application Priority Data

Nov. 20, 1992 [JP] Japan .................. 4-335359

[51] Int. Cl.⁶ ........................................ F16F 9/34
[52] U.S. Cl. .............................. 188/299; 188/318; 188/322.13
[58] Field of Search ............ 188/266, 281, 297, 299, 188/311, 313–318, 282, 322.13–322.15; 267/113, 118, 124, 140.14, 140.15

[56] References Cited

U.S. PATENT DOCUMENTS

| | | | |
|---|---|---|---|
| 2,048,037 | 7/1936 | Smith | 188/281 |
| 2,237,915 | 4/1941 | Routson | 188/281 X |
| 3,213,973 | 10/1965 | Damon | 188/315 X |
| 3,795,291 | 3/1974 | Naito et al. | 188/318 X |
| 4,673,068 | 6/1987 | De Bruijn | 188/318 X |
| 4,732,244 | 3/1988 | Verkuylen | 188/318 |
| 4,880,086 | 11/1989 | Knecht et al. | 188/299 |
| 5,180,039 | 1/1993 | Axthammer et al. | 188/315 X |

FOREIGN PATENT DOCUMENTS

| | | | |
|---|---|---|---|
| 2851070 | 6/1979 | Germany | 188/315 |
| 223822 | 4/1990 | United Kingdom | 188/299 |
| 2234041 | 1/1991 | United Kingdom | 188/318 |

Primary Examiner—Robert J. Oberleitner
Assistant Examiner—Alfred Muratori
Attorney, Agent, or Firm—Wenderoth, Lind & Ponack

[57] ABSTRACT

A damping force control type hydraulic shock absorber has a piston that has main hydraulic fluid passages and valve mechanisms and also has a piston rod connected thereto. One side of the cylinder of the shock absorber is provided with a damping force control mechanism having a guide member and a shutter, which open and close a bypass passage, and a valve mechanism that generates damping force by controlling the flow of hydraulic fluid through the bypass passage. Damping force characteristics are changed by rotating the shutter with a rotary actuator. Since the damping force control mechanism is provided on the side of the cylinder and the piston is provided with only the main hydraulic fluid passages and the valve mechanisms, the size of the piston assembly is relatively small. Accordingly, the stroke of the piston rod can be increased.

4 Claims, 5 Drawing Sheets

DAMPING FORCE CONTROL TYPE HYDRAULIC SHOCK ABSORBER

BACKGROUND OF THE INVENTION

1. Field of the Invention

The present invention relates to a damping force control type hydraulic shock absorber attached to a suspension system of a vehicle, for example, an automobile.

2. Description of the Related Art

Hydraulic shock absorbers attached to suspension systems of automobiles or other vehicles include damping force control type hydraulic shock absorbers which are designed so that the level of damping force can be properly controlled in accordance with the road surface conditions, vehicle running conditions, etc., with a view to improving the ride quality and the steering stability.

In general, this type of hydraulic shock absorber includes a cylinder having a hydraulic fluid sealed therein, and a piston which has a piston rod connected thereto and which is slidably fitted in the cylinder to define therein two cylinder chambers. The two cylinder chambers are communicated with each other by a main hydraulic fluid passage and a bypass passage. The main hydraulic fluid passage is provided with a damping force generating mechanism (including an orifice, a disk valve, etc.) for generating a relatively large damping force. The bypass passage is provided with a damping force generating mechanism (including an orifice, a disk valve, etc.) for generating a relatively small damping force, and with a damping force control valve for opening and closing the bypass passage.

With the above-described arrangement, when the damping force control valve is opened, the hydraulic fluid in the cylinder is induced to flow mainly through the bypass passage by the sliding movement of the piston caused by the extension and contraction of the piston rod, thereby generating a relatively small damping force. Accordingly, the damping force characteristics are "soft". When the damping force control valve is closed, the hydraulic fluid in the cylinder is induced to flow only through the main hydraulic fluid passage by the sliding movement of the piston caused by the extension and contraction of the piston rod, thereby generating a relatively large damping force. Accordingly, the damping force characteristics are "hard". Thus, the damping force characteristics can be changed by opening and closing the damping force control valve.

Incidentally, when a damping force control type hydraulic shock absorber of the type described above is designed to have valve damping force characteristics in which the damping force linearly changes in accordance with the piston speed for both the "hard" and "soft" characteristics, an arrangement as described, for example, in Japanese Patent Application Public Disclosure (KOKAI) No. 04-54339 has heretofore been employed. That is, a piston, which is fitted in a cylinder, and a piston rod, which is connected to the piston, are provided with a main hydraulic fluid passage, a bypass passage, and a damping force control valve for opening and closing the bypass passage, and the main hydraulic fluid passage and the bypass passage are provided with respective valve mechanisms. In addition, a control rod for actuating the damping force control valve extends through the piston rod and projects outwardly from the outer end of the piston rod, so that the damping force characteristics can be changed over from one to another by actuating the control rod with an actuator or the like from the outside of the hydraulic shock absorber.

However, the conventional damping force control type hydraulic shock absorber, in which a piston assembly consisting of a piston and elements connected thereto is provided with a bypass passage and a damping force control valve, suffers from problems as described below. That is, since the piston assembly is provided with a bypass passage, and the bypass passage is provided with a control valve or other element for controlling the damping force, the size of the piston assembly increases, and the extension and contraction stroke of the piston rod inevitably shortens.

In addition, the actuator for operating the control rod for the damping force control valve is usually attached to the distal end of the piston rod, which is connected to a member provided on the vehicle body. Therefore, a piston rod mounting member (e.g., a strut mount) installed on the vehicle body must be provided with a space for mounting the actuator, which deteriorates the space efficiency on the vehicle body. Accordingly, the conventional arrangement goes against the demand for the engine hood to lower at the piston rod mounting part on the front wheel side of an automobile. In particular, a suspension system in which the damping force characteristics of a hydraulic shock absorber are controlled in real time during running (i.e., what is called a semiactive suspension system) needs a large-sized actuator for rapidly changing the damping force characteristics. Therefore, the deterioration of the space efficiency becomes a serious problem.

SUMMARY OF THE INVENTION

In view of the above-described circumstances, it is an object of the present invention to provide a damping force control type hydraulic shock absorber designed so that the extension and contraction stroke is increased by reducing the size of the piston assembly.

To attain the above-described object, the present invention provides a damping force control type hydraulic shock absorber including a cylinder having a hydraulic fluid sealed therein, and a piston slidably fitted in the cylinder to define therein two cylinder chambers. A piston rod is connected at one end thereof to the piston. The other end portion of the piston rod extends as far as the outside of the cylinder. A reservoir chamber is communicated with the cylinder to compensate for changes in the amount of hydraulic fluid in the cylinder caused by the piston rod as it enters and withdraws from the cylinder. A main hydraulic fluid passage is provided in the piston to provide communication between the two cylinder chambers. A first valve mechanism generates damping force by controlling the flow of hydraulic fluid in the main hydraulic fluid passage during at least one of extension and retraction strokes of the piston rod. A bypass passage is provided outside the cylinder to provide communication between the two cylinder chambers. A second valve mechanism generates damping force by controlling the flow of hydraulic fluid in the bypass passage during at least one of the extension and contraction strokes of the piston rod. A damping force control valve controls the passage area of the bypass passage.

In addition, the present invention provides a damping force control type hydraulic shock absorber including a cylinder having a hydraulic fluid sealed therein, and a piston slidably fitted in the cylinder to define therein two cylinder chambers. A piston rod is connected at one end thereof to the piston. The other end portion of the piston rod extends as far as the outside of the cylinder. A reservoir chamber is communicated with the cylinder to compensate for changes in amount of hydraulic fluid in the cylinder caused by the piston rod as it enters and withdraws from the cylinder. A main hydraulic fluid passage is provided in the piston to provide communication between the two cylinder chambers. A first valve mechanism generates damping force by controlling the flow of hydraulic fluid in the main hydraulic fluid passage. A bypass passage is provided outside the cylinder to provide communication between the two cylinder chambers. A pair of first and second check valves are provided in series to the bypass passage to allow flow of hydraulic fluid in respective directions opposite to each other. A first hydraulic fluid passage bypasses the first check valve. A second hydraulic fluid passage bypasses the second check valve. A first damping force control valve enables variation in the passage area of the first hydraulic fluid passage. A second damping force control valve enables variation in the passage area of the second hydraulic fluid passage.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and of which.

DESCRIPTION OF THE PREFERRED EMBODIMENTS

Embodiments of the present invention will be described below in detail with reference to the accompanying drawings.

Figure 1:
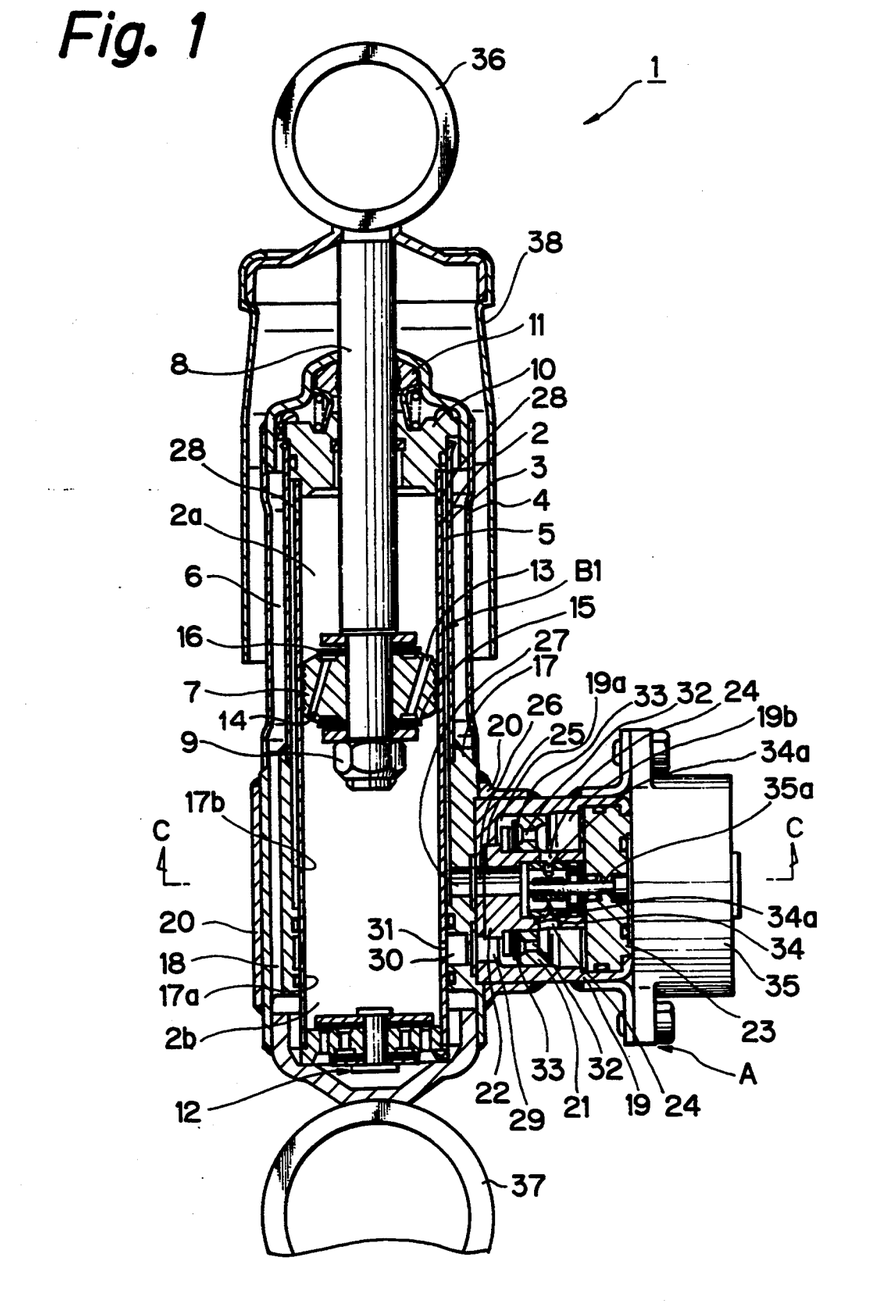
FIG. 1 is a longitudinal sectional front view of a first embodiment of the damping force control type hydraulic shock absorber according to the present invention.
Figure 2:
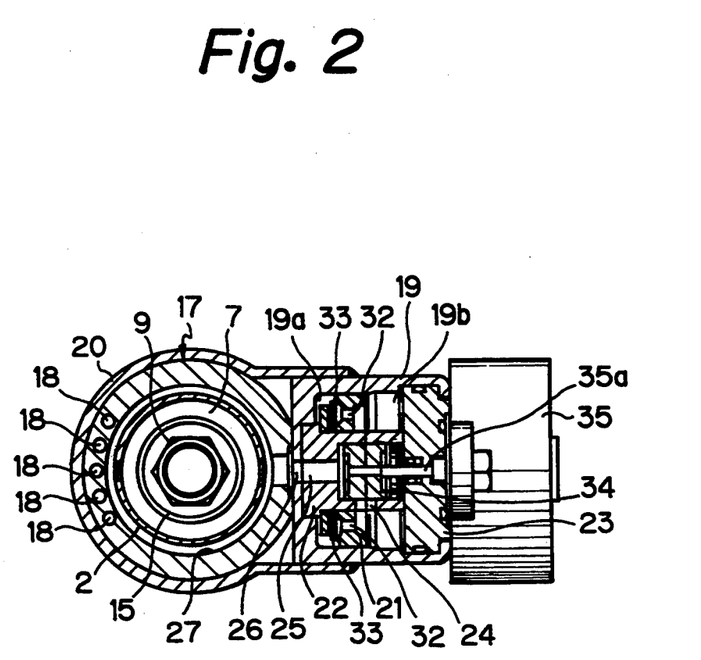
FIG. 2 is a sectional view taken along the line C—C in FIG. 1.
Figure 3:
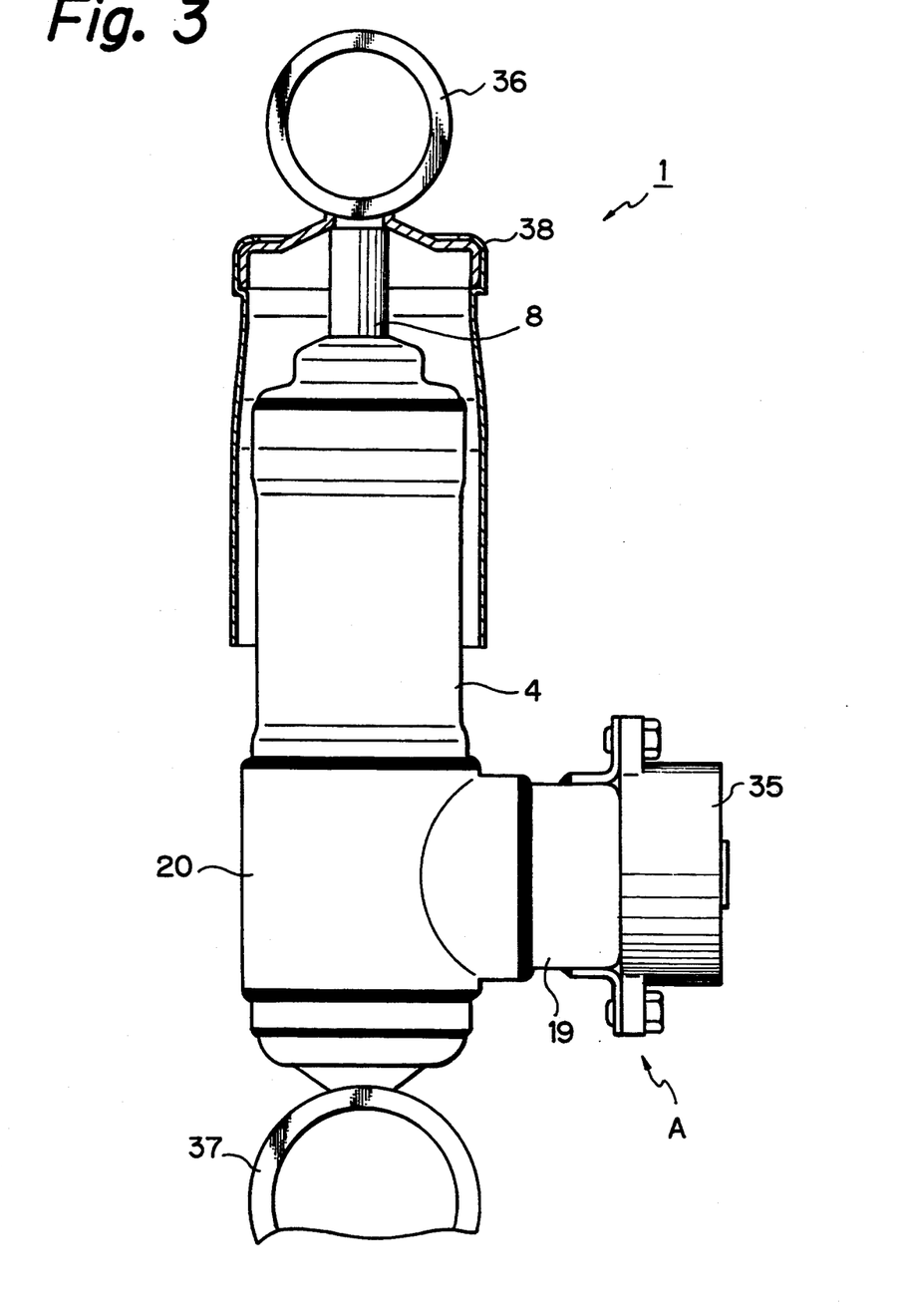
FIG. 3 is a front view of the hydraulic shock absorber shown in FIG. 1.

A first embodiment will be described with reference to FIGS. 1 to 3. As shown in these figures, a damping force control type hydraulic shock absorber 1 includes a cylinder having a triple cylinder structure which includes a central cylinder 2, an inner cylinder 3 provided outside the central cylinder 2, and an outer cylinder 4 provided outside the inner cylinder 3. An annular passage 5 is formed between the central cylinder 2 and the inner cylinder 3, and a reservoir chamber 6 is formed between the inner and outer cylinders 3 and 4.

A piston 7 is slidably fitted in the cylinder 2. The piston 7 divides the inside of the cylinder 2 into two chambers, that is, an upper cylinder chamber 2a and a lower cylinder chamber 2b. One end of a piston rod 8 is connected to the piston 7 by a nut 9. The other end portion of the piston rod 8 extends as far as the outside of the cylinder 2 through a rod guide 10 and a seal member 11, which are provided in the upper end portion of the cylinder 2. A base valve 12 is provided in the lower end portion of the cylinder 2. The lower cylinder lower chamber 2b and the reservoir chamber 6 are communicated with each other through the base valve 12 such that during the extension stroke of the piston rod 8, there is substantially no resistance to the communication between the chambers 2b and 6, whereas, during the retraction stroke, there is some resistance to the communication between the two chambers. The cylinder 2 has a hydraulic fluid sealed therein. The reservoir chamber 6 has both the hydraulic fluid and a gas sealed therein so that a change in the amount of hydraulic fluid in the cylinder 2, which corresponds to the amount by which the piston rod 8 enters or withdraws from the cylinder 2 as it performs reciprocating motion, is absorbed by compression or expansion of the gas in the reservoir chamber 6.

The piston 7 is provided with main hydraulic fluid passages 13 and 14 for providing communication between the upper and lower cylinder chambers 2a and 2b. One end face of the piston 7 is provided with a valve mechanism 15 that generates damping force by controlling the flow of hydraulic fluid in the main hydraulic passage 13 during the extension stroke of the piston rod 8. The other end face of the piston 7 is provided with a valve mechanism 16 that generates damping force by controlling the flow of hydraulic fluid in the main hydraulic passage 14 during the retraction stroke of the piston rod 8. The valve mechanisms 15 and 16 constitute a first valve mechanism (generating a relatively large damping force).

A substantially cylindrical passage member 17 includes a lower portion 17a having a relatively small inner diameter, and an upper portion 17b having a relatively large inner diameter. The lower portion 17a of the passage member 17 is fitted on the outer periphery of the lower end portion of the cylinder 2. The lower end portion of the inner cylinder 3 is fitted to the upper end portion of the upper portion 17b of the passage member 17. The annular passage 5 extends between the cylinder 2 and the upper portion 17b of the passage member 17. In addition, the outer cylinder 4 is fitted to the outer side of the upper end portion of the passage member 17. The passage member 17 has reservoir passages 18 axially extending through the side wall thereof. Thus, the reservoir chamber 6 is communicated with the lower cylinder chamber 2b through the reservoir passages 18 and the base valve 12.

A damping force control mechanism A is attached to one side of the passage member 17. The damping force control mechanism A includes a valve casing 19 in the shape of a cylinder, one end of which is closed. The valve casing 19 is attached to the side of the passage member 17 by fitting a T-shaped pipe member 20 on the passage member 17 and the valve casing 19 and welding it to both of them. A partition member 21 is fitted in the valve casing 19, and a guide member 22 in the shape of a cylinder, one end of which is closed, is fitted in the partition member 21. A plug 23 is fitted in the open end portion of the valve casing 19. Thus, the inside of the valve casing 19 is divided into two chambers 19a and 19b by the partition member 21 and the guide member 22.

The chamber 19b is communicated with the annular passage 5 through ports 24 provided in the side wall of the guide member 22, a passage 25 in the bottom of the guide member 22, a passage 26 in the bottom of the valve casing 19, and a passage 27 in the side wall of the upper portion 17b of the passage member 17. The annular passage 5 is communicated with the upper cylinder chamber 2a through passages 28 provided in the side wall of the upper end portion of the cylinder 2. The chamber 19a is communicated with the lower cylinder chamber 2b through a passage 29 provided in the bottom of the valve casing 19, an annular groove 30 in the lower portion 17a of the passage member 17, and passages 31 in the side wall of the lower end portion of the cylinder 2. The partition member 21 is provided with hydraulic fluid passages 32 for providing communication between the chambers 19a and 19b. The partition member 21 is further provided with a valve mechanism 33 as a second valve mechanism (generating a relatively small damping force) that generates damping force by controlling the flow of hydraulic fluid from the chamber 19b toward the chamber 19a through the hydraulic fluid passages 32 and that prevents the flow of hydraulic fluid in the opposite direction. That is, a bypass passage $B_1$ for providing communication between the upper and lower cylinder chambers 2a and 2b is composed of an upper bypass passage portion including the passages 28, the annular passage 5, the passages 27, 26 and 25, and the chamber 19b, a lower bypass passage portion including the passages 31, the annular groove 30, the passage 29, and the chamber 19a, and the hydraulic fluid passages 32, through which the upper and lower bypass passage portions are communicated with each other.

A cylindrical shutter 34 is rotatably fitted in the guide member 22. The side wall of the shutter 34 is provided with ports 34a such that these ports 34a can face the ports 24 provided in the guide member 22. Thus, the passage area for communication between the passage 25 and the chamber 19b can be controlled by rotating the shutter 34. That is, the guide member 22 and the shutter 34 constitute a damping force control valve which opens and closes the bypass passage $B_1$ and controls the passage area by rotation of the shutter 34. The shutter 34 is connected to a rotary actuator 35, which includes a stepping motor attached to the open end portion of the valve casing 19, through a rod 35a extending through the plug 23, so that the shutter 34 is rotated by externally activating the rotary actuator 35.

It should be noted that reference numerals 36 and 37 denote mounting eyes, and 38 a dust cover.

The operation of the first embodiment, arranged as described above, will be explained below. When the bypass passage $B_1$ is shut off by rotating the shutter 34 with the rotary actuator 35, the hydraulic fluid in the cylinder 2 is induced to flow by the sliding movement of the piston 7 caused by the extension and retraction of the piston rod 8 as follows: During the extension stroke, the hydraulic fluid flows through the main hydraulic passage 13 in the piston 7, causing a relatively large damping force to be generated by the valve mechanism 15. During tile retraction stroke, the hydraulic fluid flows through the main hydraulic passage 14 in the piston 7, causing a relatively large damping force to be generated by the valve mechanism 16. Thus, "hard" damping force characteristics in which relatively large damping force is generated during both the extension and contraction strokes are obtained.

When the bypass passage $B_1$ is opened by rotating the shutter 34, the hydraulic fluid in the cylinder 2 is caused to flow by the sliding movement of the piston 7 as follows. During the extension stroke, the hydraulic fluid flows via the bypass passage $B_1$ through the hydraulic fluid passages 32 in the partition member 21, causing a relatively small damping force to be generated by the valve mechanism 33. During the retraction stroke, since the valve mechanism 33 prevents the flow of hydraulic fluid through the hydraulic fluid passages 32, the hydraulic fluid flows through the main hydraulic passage 14 in the piston 7, causing a relatively large damping force to be generated by the valve mechanism 16. Thus, the relatively small damping force is generated during the extension stroke, and "hard" damping force characteristics are obtained in which relatively large damping force is generated during the retraction stroke. In addition, it is possible to control the orifice characteristics of damping force for the extension side, where "soft" characteristics are obtained, by controlling the passage area of the bypass passage $B_1$ through the shutter 34.

In the first embodiment, the bypass passage $B_1$ is provided outside the cylinder 2, and the damping force control mechanism A is provided on the side of the cylinder 2. Further, the piston 7 is provided with only the main hydraulic passages 13 and 14 and the valve mechanisms 15 and 16. Therefore, the size of the piston assembly does not become large as in the case of the above-described prior art. Accordingly, the extension and retraction stroke of the piston rod 8 can be set at a sufficiently large value. In addition, since the rotary actuator 35 is provided on the side of the cylinder 2, a piston rod mounting member (e.g., a strut mount) installed on the vehicle body need not be provided with a space for mounting the actuator. Accordingly, the space efficiency on the vehicle body increases.

Although in the first embodiment the flow of hydraulic fluid through the hydraulic fluid passages 32 is allowed only during the extension stroke by the action of the valve mechanism 33 provided on the partition member 21, it should be noted that the valve mechanism 33 may be replaced by a valve mechanism that generates damping force with respect to the flow of hydraulic fluid through the hydraulic fluid passages 32 in both directions, thereby generating the relatively small damping force during both the extension and retraction strokes in the "soft" characteristics mode in which the bypass passage $B_1$ is open.

Next, a second embodiment of the present invention will be explained with reference to FIG. 4. It should be noted that the second embodiment differs from the first embodiment only in the arrangement of the passage member attached to the cylinder assembly, which is composed of the central cylinder 2, the inner cylinder 3 and the outer cylinder 4, and in the arrangement of the damping force control mechanism attached to the side of the passage member. Therefore, constituent members similar to those in the first embodiment are denoted by the same reference numerals, and only the portions or members in which the second embodiment differs from the first embodiment will be explained in detail.

Figure 4:
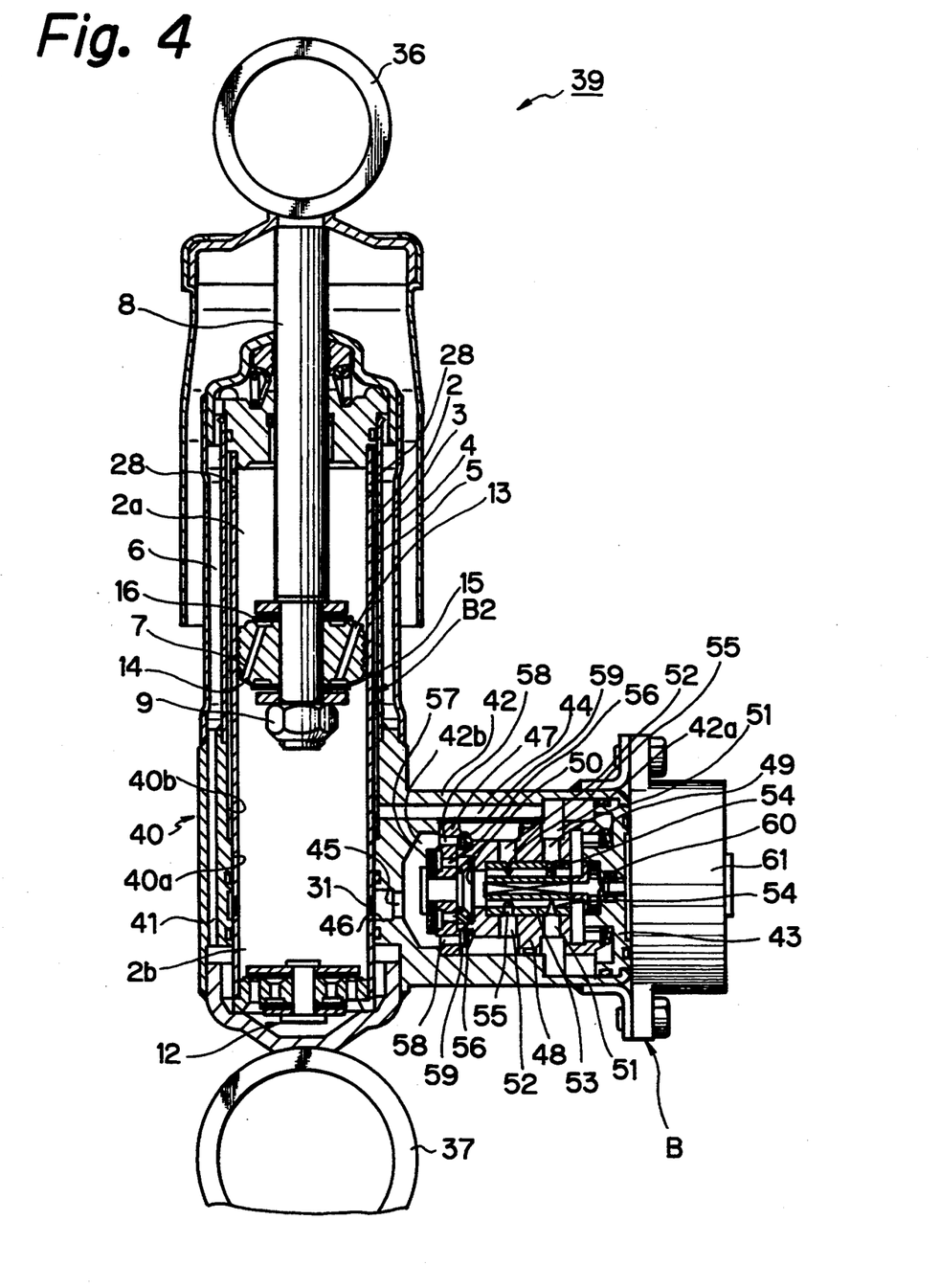
FIG. 4 is a longitudinal sectional front view of a second embodiment of the damping force control type hydraulic shock absorber according to the present invention.

As shown in FIG. 4, a damping force control type hydraulic shock absorber 39 has a cylindrical passage member 40. The passage member 40 includes a lower portion 40a having a relatively small inner diameter, and an upper portion 40b having a relatively large inner diameter. The lower portion 40a of the passage member 40 is fitted on the outer periphery of the lower end portion of the cylinder 2. The lower end portion of the inner cylinder 3 is fitted to the upper end portion of the upper portion 40b of the passage member 40. The annular passage 5 extends between the cylinder 2 and the upper portion 40b of the passage member 40. In addition, the outer cylinder 4 is fitted to the outer side of the upper end portion of the passage member 40. The passage member 40 has reservoir passages 41 axially extending through the side wall thereof. Thus, the reservoir chamber 6 is communicated with the lower cylinder chamber 2b through the reservoir passages 41 and the base valve 12.

A damping force control mechanism B is attached to one side of the passage member 40. The damping force control mechanism B includes a cylindrical valve casing 42 which is provided integrally with the side of the passage member 40. A plug 43 is attached to the open end portion of the valve casing 42 to form a chamber in the valve casing 42. The chamber in the valve casing 42 is communicated with the annular passage 5 through a passage 44 provided in the side wall of the valve casing 42, and it is further communicated with the cylinder lower chamber 2b through a passage 45 and an annular groove 46, which are provided in the side wall of the lower portion 40a of the passage member 40, and passages 31 in the side wall of the cylinder 2. Thus, the passages 28, the annular passage 5, the chamber in the valve casing 42, the passage 45, the annular groove 46, and the passages 31 constitute a bypass passage $B_2$ that provides communication between the cylinder upper and lower chambers 2a and 2b.

A partition member 47 and a substantially cylindrical guide member 48 are fitted in the valve casing 42. The guide member 48 divides the inside of the valve casing 42 into two chambers, that is, a chamber 42a closer to the passage 44 (i.e., closer to the upper cylinder chamber 2a) and a chamber 42a closer to the passage 45 (i.e., closer to the lower cylinder chamber 2b). The two chambers 42a and 42b are communicated with each other through the inside of the guide member 48. The end of the guide member 48 which is closer to the chamber 42a is provided with a first check valve 49 which allows the flow of hydraulic fluid from the inside of the guide member 48 toward the passage 44 but prevents the flow of hydraulic fluid in the opposite direction. The end of the guide member 48 which is closer to the chamber 42b is provided with a second check valve 50 which allows the flow of hydraulic fluid from the inside of the guide member 48 toward the passage 45 but prevents the flow of hydraulic fluid in the opposite direction. In addition, the side wall of the guide member 48 is provided with ports 51 which open into the chamber 42a to serve as a first hydraulic fluid passage that bypasses the first check valve 49 to provide communication between the inside of the guide member 48 and the passage 44. The side wall of the guide member 48 is further provided with ports 52 which open into the chamber 42b to serve as a second hydraulic fluid passage that bypasses the second check valve 50 to provide communication between the inside of the guide member 48 and the passage 45.

A cylindrical shutter 53 is rotatably fitted in the guide member 48. The side wall of the shutter 53 is provided with ports 54 and 55 such that these ports 54 and 55 can face the ports 51 and 52, respectively, which are provided in the guide member 48. The ports 54 of the shutter 53 are comprised of a plurality of openings, the width of each opening increasing in one circumferential direction of the shutter 53 and the ports 55 of the shutter are comprised of a plurality of openings, the with of each opening increasing in the other circumferential direction. The ports 54 and 55 are disposed so that the ports 51 and 52 of the guide member 48 can be selectively opened and closed in response to the rotation of the shutter 53 as follows: both the ports 51 and 52 are opened; both of them are closed; one of them is opened with the other closed; or one of them is closed with the other opened. The ports 54 and 55 are further arranged such that the passage area can be controlled in accordance with the condition of alignment with the ports 51 and 52 in each of the above-described selective states. That is, the guide member 48 and the shutter 53 constitute a first damping force control valve that controls the passage area of the ports 51 serving as a first hydraulic fluid passage, and also a second damping force control valve that controls the passage area of the ports 52 serving as a second hydraulic fluid passage.

The partition member 47 is provided with hydraulic fluid passages 56 that allow the flow of hydraulic fluid from the inside of the guide member 48 toward the passage 45 through the second check valve 50 to generate damping force, and a valve mechanism 57 (generating a relatively small damping force) including a disk valve clamped at the inner periphery thereof to serve as a second valve mechanism. The partition member 47 is further provided with hydraulic fluid passages 58 that allow the flow of hydraulic fluid from the passage 45 toward the ports 52 of the guide member 48 to generate damping force, and a valve mechanism 59 including a disk valve and springs for biasing the disk valve. The valve mechanism 59 serves as a second valve mechanism.

The shutter 53 is connected to a rotary actuator 61, which is attached to the open end portion of the valve casing 42, through a rod 60 extending through the plug 43, so that the shutter 53 is rotated by externally activating the rotary actuator 61.

The operation of the second embodiment, arranged as described above, will be explained below. When all the ports 51 and 52 of the guide member 48 are opened by rotating the shutter 53 with the rotary actuator 61, the first check valve 49 is bypassed by the ports 51, and the second check valve 50 is bypassed by the ports 52. Accordingly, the bypass passage $B_2$ is open at all times during the extension and contraction strokes. Consequently, the hydraulic fluid in the cylinder 2 is induced to flow through the bypass passage $B_2$ during both the extension and retraction strokes by the sliding movement of the piston 7 caused by the extension and retraction of the piston rod 8. During the extension stroke, relatively small damping force is generated by the valve mechanism 57 provided on the partition member 47. During the retraction stroke, relatively small damping force is generated by the valve mechanism 59 provided on the partition member 47. That is, the damping force characteristics are "soft" during both the extension and retraction strokes.

When the ports 51 are opened with the ports 52 closed by rotating the shutter 53, the first check valve 49 is bypassed by the ports 51. Therefore, the bypass passage $B_2$ is opened through the second check valve 50. Accordingly, the bypass passage $B_2$ allows the flow of hydraulic fluid from the upper cylinder chamber 2a toward the lower cylinder chamber 2b but prevents the flow of hydraulic fluid in the opposite direction. Consequently, during the extension stroke of the piston rod 8, the hydraulic fluid in the cylinder 2 flows through the bypass passage $B_2$, causing the relatively small damping force to be generated by the valve mechanism 57 provided on the partition member 47. During the retraction stroke, the hydraulic fluid in the cylinder 2 flows through the main hydraulic passage 14 in the piston 7, causing the relatively large damping force to be generated by the valve mechanism 16. That is, the damping force characteristics are "soft" during the extension stroke but "hard" during the retraction stroke.

When the ports 51 of the guide member 48 are closed with the ports 52 opened by rotating the shutter 53, the second check valve 50 is bypassed by the ports 52. Therefore, the bypass passage $B_2$ is opened through the first check valve 49. Accordingly, the bypass passage $B_2$ allows the flow of hydraulic fluid from the lower cylinder chamber 2b toward the upper cylinder chamber 2a but prevents the flow of hydraulic fluid in the opposite direction. Consequently, during the extension stroke of the piston rod 8, the hydraulic fluid in the cylinder 2 flows through the main hydraulic passage 13 in the piston 7, causing relatively large damping force to be generated by the valve mechanism 15. During the retraction stroke, the hydraulic fluid in the cylinder 2 flows through the bypass passage $B_2$, causing a relatively small damping force to be generated by the valve mechanism 59. That is, the damping force characteristics are "hard" during the extension stroke but "soft" during the retraction stroke.

When all the ports 51 and 52 are closed by rotating the shutter 53, the bypass passage $B_2$ is shut off at all times during the extension and retraction strokes by the first and second check valves 49 and 50. Accordingly, the hydraulic fluid in the cylinder 2 is induced to flow by the sliding movement of the piston 5 caused by the extension and contraction of the piston rod 8 as follows. During the extension stroke, the hydraulic fluid flows through the main hydraulic passage 13 in the piston 7, causing a relatively large damping force to be generated by the valve mechanism 15. During the retraction stroke, the hydraulic fluid flows through the main hydraulic passage 14 in the piston 7, causing a relatively large damping force to be generated by the valve mechanism 16. That is, the damping force characteristics are "hard" during both the extension and contraction strokes.

Thus, by changing the position of the shutter 53 through rotation, the damping force characteristics can be selectively changed among 4 different kinds of combinations: (1) "soft" during both the extension and retraction strokes; (2) "soft" during the extension stroke, but "hard" during the retraction stroke; (3) "hard" during the extension stroke, but "soft" during the retraction stroke; and (4) "hard" during both the extension and retraction strokes.

In addition, it is possible to obtain advantages similar to those in the first embodiment. That is, the bypass passage $B_2$ is provided outside the cylinder 2, and the damping force control mechanism B is provided on the side of the cylinder 2. Further, the piston 7 is provided with only the main hydraulic passages 13 and 14 and the valve mechanisms 15 and 16. Therefore, the size of the piston assembly does not become large as in the case of the above-described prior art. Accordingly, the extension and retraction stroke of the piston rod 8 can be set at a sufficiently large value. In addition, since the rotary actuator 61 is provided on the side of the cylinder 2, a piston rod mounting member (e.g., a strut mount) installed on the vehicle body need not be provided with a space for mounting the actuator. Accordingly, the space efficiency on the vehicle body side increases.

Although in the second embodiment the valve mechanisms 57 and 59 are provided on the partition member 47 to generate a damping force of valve characteristics for the "soft" characteristics, it should be noted that the arrangement is not necessarily limited thereto but may be such that the valve mechanisms 57 and 59 are omitted, and the damping force of orifice characteristics is generated on the basis of the passage area of the ports 51 and 52 of the guide member 48.

In the second embodiment, the lower cylinder chamber 2b is connected to the reservoir chamber 6 through the base valve 12 and the bypass passage $B_2$ is provided so as to communicate the upper and lower cylinder chambers 2a and 2b completely independently from the communication system between the lower cylinder chamber 2b and the reservoir chamber 6. Therefore, in a retraction stroke, the hydraulic fluid in the lower cylinder chamber is forcibly expelled therefrom into the upper cylinder chamber 2a through the bypass passage $B_2$. Therefore, negative pressure is not apt to be established in the upper cylinder chamber 2a. Thus, the damping characteristics attained by the invention are the same as those obtained by the ordinary arrangement in which a bypass passage is formed through the piston.

The following is a description of one example of control in a case where the damping force control type hydraulic shock absorber of the foregoing embodiments are applied to a semiactive suspension system.

Figure 5:
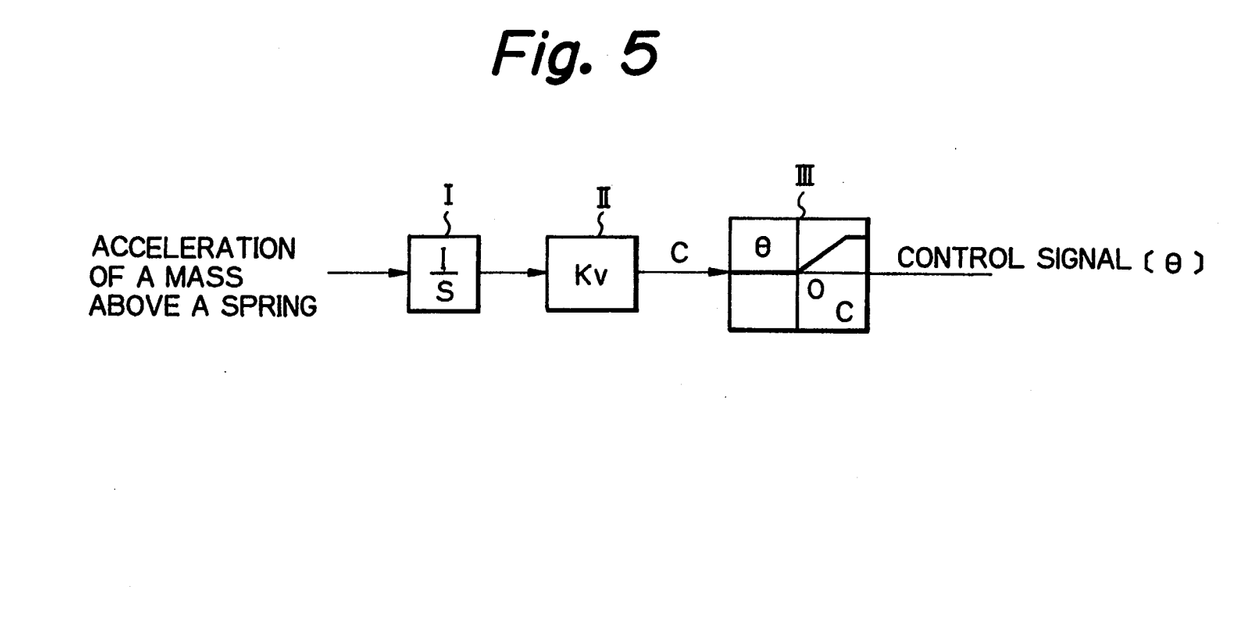
FIG. 5 is a block diagram of a controller for a semiactive suspension system to which the damping force control type hydraulic shock absorber of the present invention is applied.

One example in which the hydraulic shock absorber of the first embodiment that can control damping force only for the extension side is applied to a semiactive suspension system will be explained below with reference to FIG. 5. The body of an automobile is provided with an acceleration sensor for measuring acceleration in the vertical direction. An acceleration signal obtained from the acceleration sensor is transmitted to a controller composed of blocks I to III, as shown in FIG. 5. The signal transmitted to the controller is integrated in the block I to calculate an absolute velocity (relative to the ground) in the vertical direction of the vehicle, and the absolute velocity calculated is sent to the block II ("S" shown in the block I is a Laplace operator used in a Laplace transformation). In the block II, the result of calculation made in the block I is multiplied by a gain $K_V$ to obtain a target value C for a damping coefficient, which is sent to the block III. The target value C assumes a positive value when the vehicle body moves upwardly, and it assumes a negative value when the vehicle body moves downwardly. In the block III, the angle $\theta$ of rotation of the shutter 34 is obtained from the target value C, and a control signal is output to the rotary actuator 35, which includes a stepping motor. The angle $\theta$ of rotation is set so that when $\theta \leq 0$, the passage area for communication between the passage 25 and the chamber 19b reaches a maximum, and as $\theta$ increases, the passage area decreases. With this control, the vibration of the vehicle body can be effectively suppressed.

It should be noted that in the damping force control type hydraulic shock absorber of the first embodiment the damping force control is effected only for the extension side. Even if the control is effected only for the extension side, a considerably high control effectiveness can be obtained. Accordingly, if the hydraulic shock absorber of the first embodiment (in which damping force can be controlled only for the extension side) is employed for the rear side, where the vehicle weight is relatively light, and the hydraulic shock absorber of the second embodiment (in which damping force can be controlled for both the extension and contraction sides) is employed for the front side, where the vehicle weight is relatively heavy, it is possible to obtain a control effectiveness close to that in a case where hydraulic shock absorbers which can control damping force for both the extension and retraction sides are employed for both the front and rear sides.

As has been detailed above, according to the damping force control type hydraulic shock absorber of the first embodiment of the present invention, the bypass passage is provided outside the cylinder, and the valve mechanism and the damping force control mechanism for the bypass passage are provided outside the cylinder. Therefore, the size of the piston assembly does not become large as in the case of the prior art. Accordingly, the extension and contraction stroke of the piston rod can be satisfactorily increased. In addition, since the actuator for changing over the damping force control valve is provided on the side of the cylinder, a piston rod mounting member installed on the vehicle body need not be provided with a space for mounting the actuator. Accordingly, the space efficiency on the vehicle body side increases. The damping force control type hydraulic shock absorber of the second embodiment of the present invention provides a great advantage in that damping force characteristics can be selectively changed among different combinations of characteristics for both the extension and retraction sides, in addition to the above-described advantages.

Although the present invention has been described through specific terms, it should be noted here that the described embodiments are not necessarily exclusive and that various changes and modifications may be imparted thereto without departing from the scope of the invention which is limited solely by the appended claims.

What is claimed is:

1. A damping force control type hydraulic shock absorber comprising:
    a cylinder having a hydraulic fluid sealed therein;
    a piston slidably fitted in said cylinder to define two cylinder chambers in said cylinder;
    a piston rod connected at one end thereof to said piston and another end extending outside of said cylinder;
    a reservoir chamber in communicated with said cylinder for compensate for changes in amount of hydraulic fluid in said cylinder caused by the entry and withdrawal of said piston rod from said cylinder;
    a main hydraulic fluid passage in said piston for provide communication between said two cylinder chambers;
    a first valve mechanism for generating damping force by controlling the flow of hydraulic fluid in said main hydraulic passage
    a bypass passage arrangement located outside of said cylinder defining a bypass passage providing communication between said two cylinder chambers;
    a pair of first and second check valves provided in series in said bypass passage arrangement for allowing the flow of hydraulic fluid in respective directions opposite to each other in said bypass passage;
    a first hydraulic fluid passage bypassing said first check valve;
    a second hydraulic fluid passage bypassing said second check valve;
    a unitary damping force control member having first and second damping force control valve portions adapted to change the cross sectional areas of said first and second hydraulic fluid passages, respectively, upon movement of said unitary damping force control member; and
    an actuator connected with said unitary damping force control member for moving said unitary damping force control member.

2. The damping force control shock absorber of claim 1, wherein said unitary damping force control member has a first position and a second position between which said unitary damping force control member is movable, said first and second hydraulic fluid passages have the cross sectional areas thereof changed by said unitary damping force control member in said first position such that soft damping force characteristics are provided during an extension stroke of said piston and said piston rod in said cylinder and hard damping force characteristics are provided during a retraction stroke of said piston and said piston rod in said cylinder, and said first and second hydraulic fluid passages have the cross sectional areas thereof changed by said unitary damping force control member in said second position such that hard damping force characteristics are provided during an extension stroke of said piston and said piston rod in said cylinder and soft damping force characteristics are provided during a retraction stroke of said piston and said piston rod in said cylinder.

3. The damping force control hydraulic shock absorber of claim 1, wherein said unitary damping force control member comprises a cylindrical and rotatable shutter and said first and second damping force control valve portions comprise ports in said cylindrical and rotatable shutter for controlling the respective cross sectional areas of said first and second hydraulic fluid passages, and said actuator is a rotary actuator adapted to rotate said cylindrical and rotatable shutter.

4. The damping force control hydraulic shock absorber of claim 1, wherein said bypass passage arrangement further comprises a second valve mechanism in said bypass passage adapted to generate damping force in extension and retraction strokes of said piston and said piston rod in said cylinder by controlling the flow of hydraulic fluid in said bypass passage.

* * * * *